(12) United States Patent
Itoh

(10) Patent No.: US 7,319,562 B2
(45) Date of Patent: Jan. 15, 2008

(54) ZOOM LENS SYSTEM AND IMAGE PICKUP APPARATUS INCLUDING THE ZOOM LENS SYSTEM

(75) Inventor: Yoshinori Itoh, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/567,404

(22) Filed: Dec. 6, 2006

(65) Prior Publication Data
US 2007/0139789 A1 Jun. 21, 2007

(30) Foreign Application Priority Data
Dec. 20, 2005 (JP) .............................. 2005-366407

(51) Int. Cl.
*G02B 15/14* (2006.01)
(52) U.S. Cl. ....................................................... 359/687
(58) Field of Classification Search ................ 359/676, 359/683, 687
See application file for complete search history.

(56) References Cited

U.S. PATENT DOCUMENTS

| 6,069,743 A | 5/2000 | Nagata et al. |
| 6,577,450 B2 | 6/2003 | Hamano et al. |
| 6,975,461 B2 | 12/2005 | Eguchi |

FOREIGN PATENT DOCUMENTS

| JP | 03-296706 A | 12/1991 |
| JP | 11-271616 A | 10/1999 |
| JP | 2002-107624 A | 4/2002 |
| JP | 2003-315676 A | 11/2003 |
| JP | 2004-094233 A | 3/2004 |

*Primary Examiner*—Scott J. Sugarman
(74) *Attorney, Agent, or Firm*—Canon USA Inc. IP Division

(57) ABSTRACT

At least one exemplary embodiment is directed to a zoom lens system, which includes a first, a second, a third, and a fourth lens units of positive, negative, positive, and positive refractive powers, respectively, in this order from an object side to an image side. At a telephoto end, the first lens unit is closer to the object side, a distance between the first and second lens units is larger, a distance between the second and third lens units is smaller, and a distance between the third and fourth lens units is larger, as compared to those at a wide-angle end. The first lens unit includes negative and positive lens elements. The second lens unit includes negative and positive lens elements in this order from the object side to the image side.

16 Claims, 13 Drawing Sheets

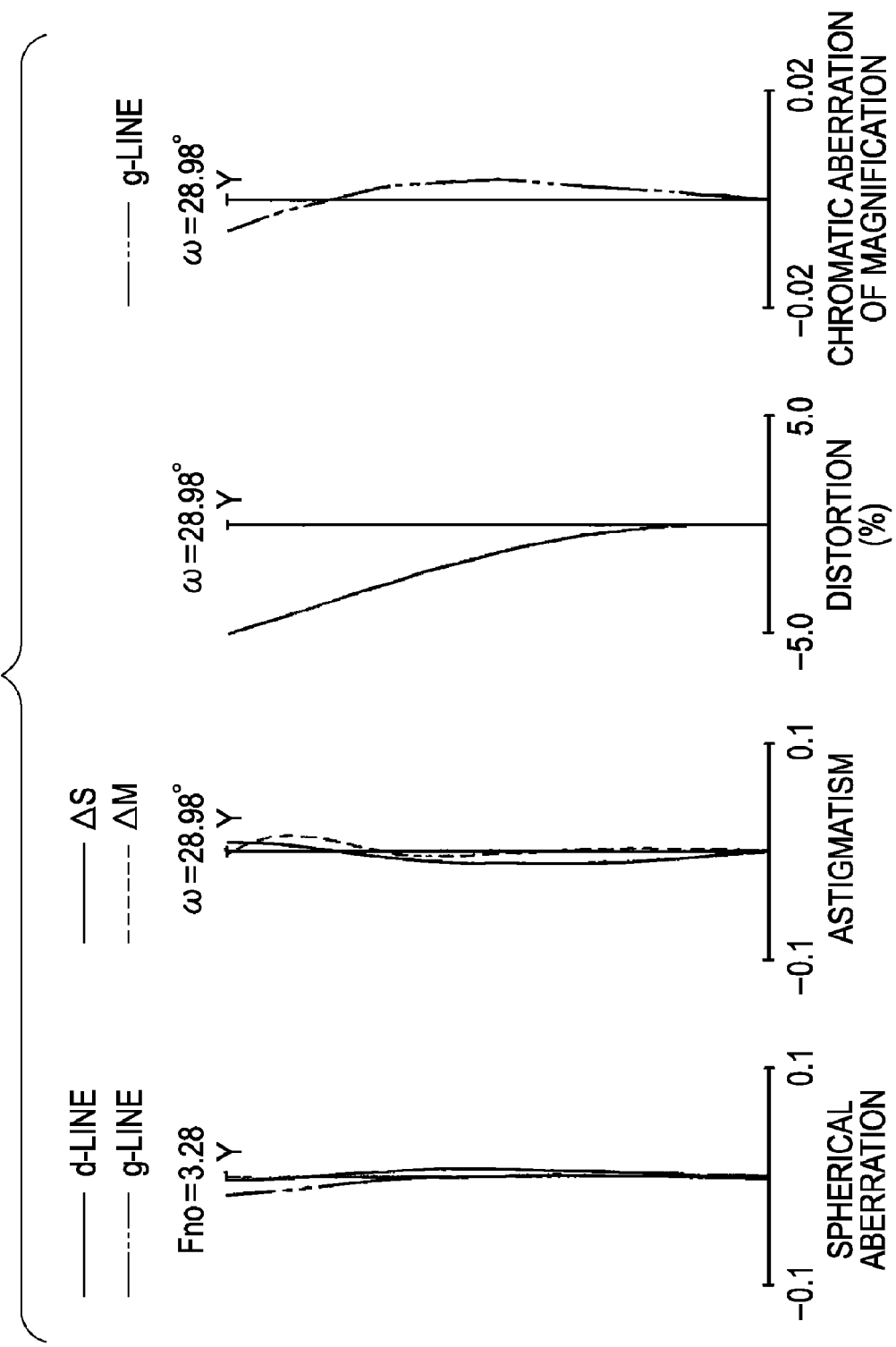

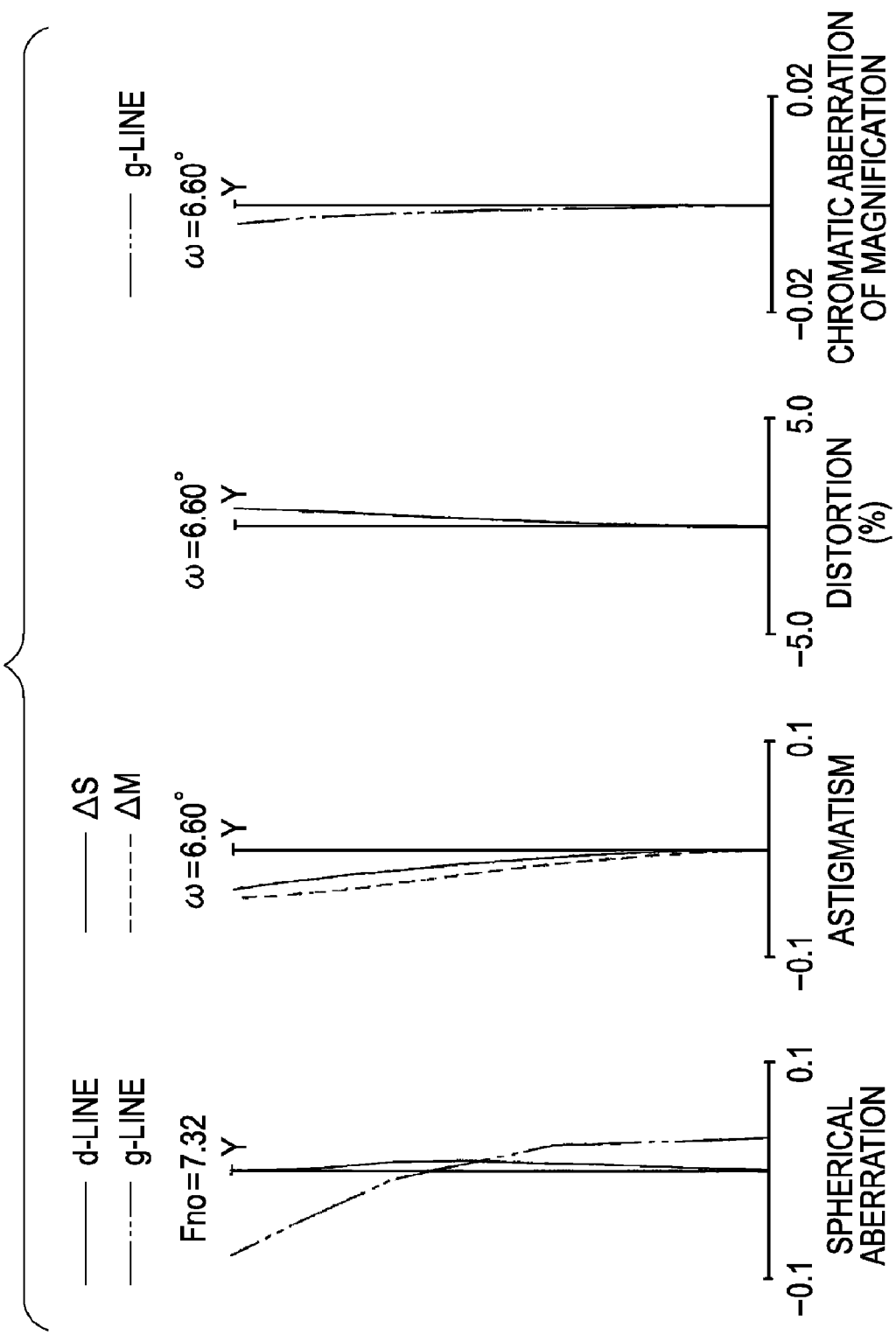

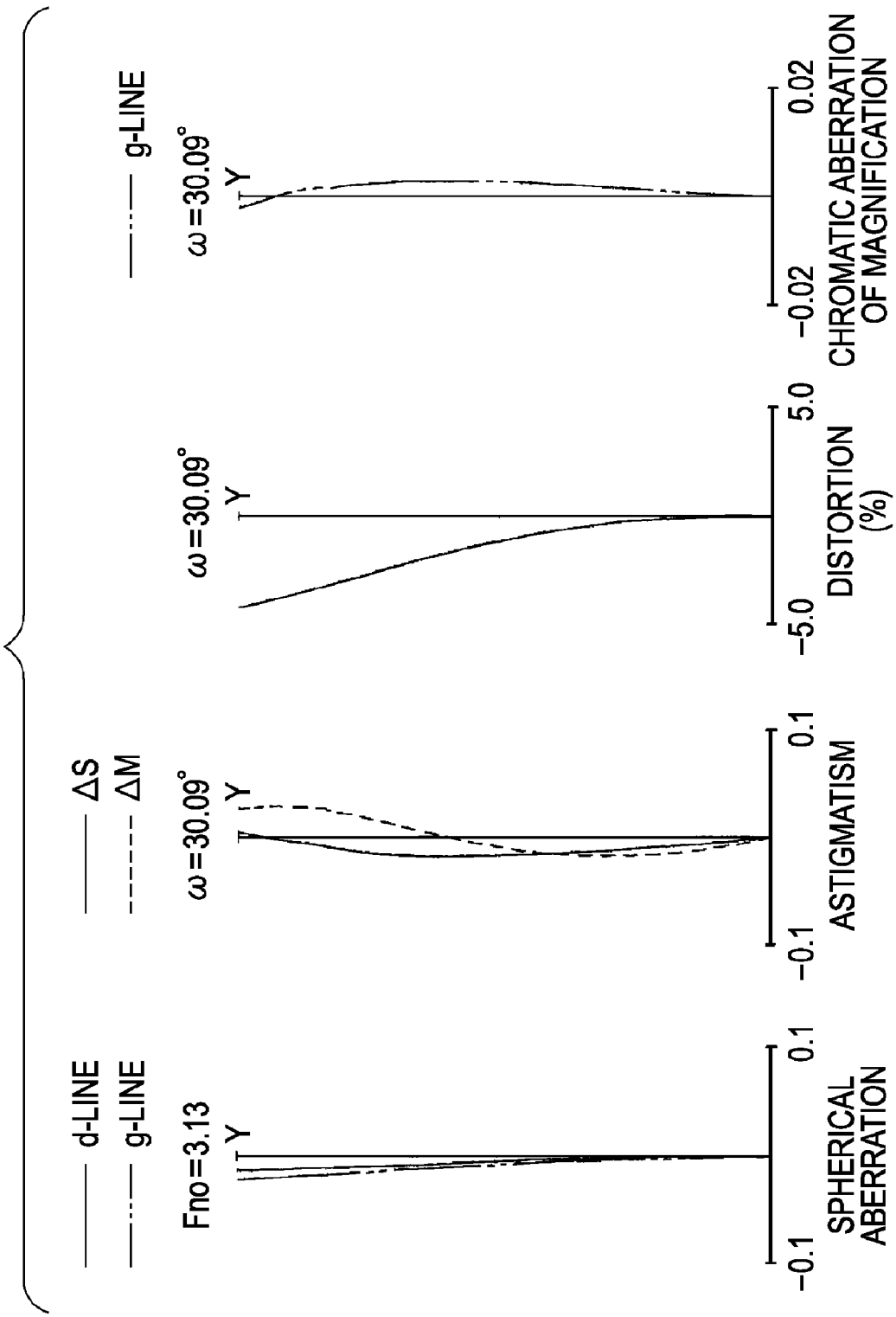

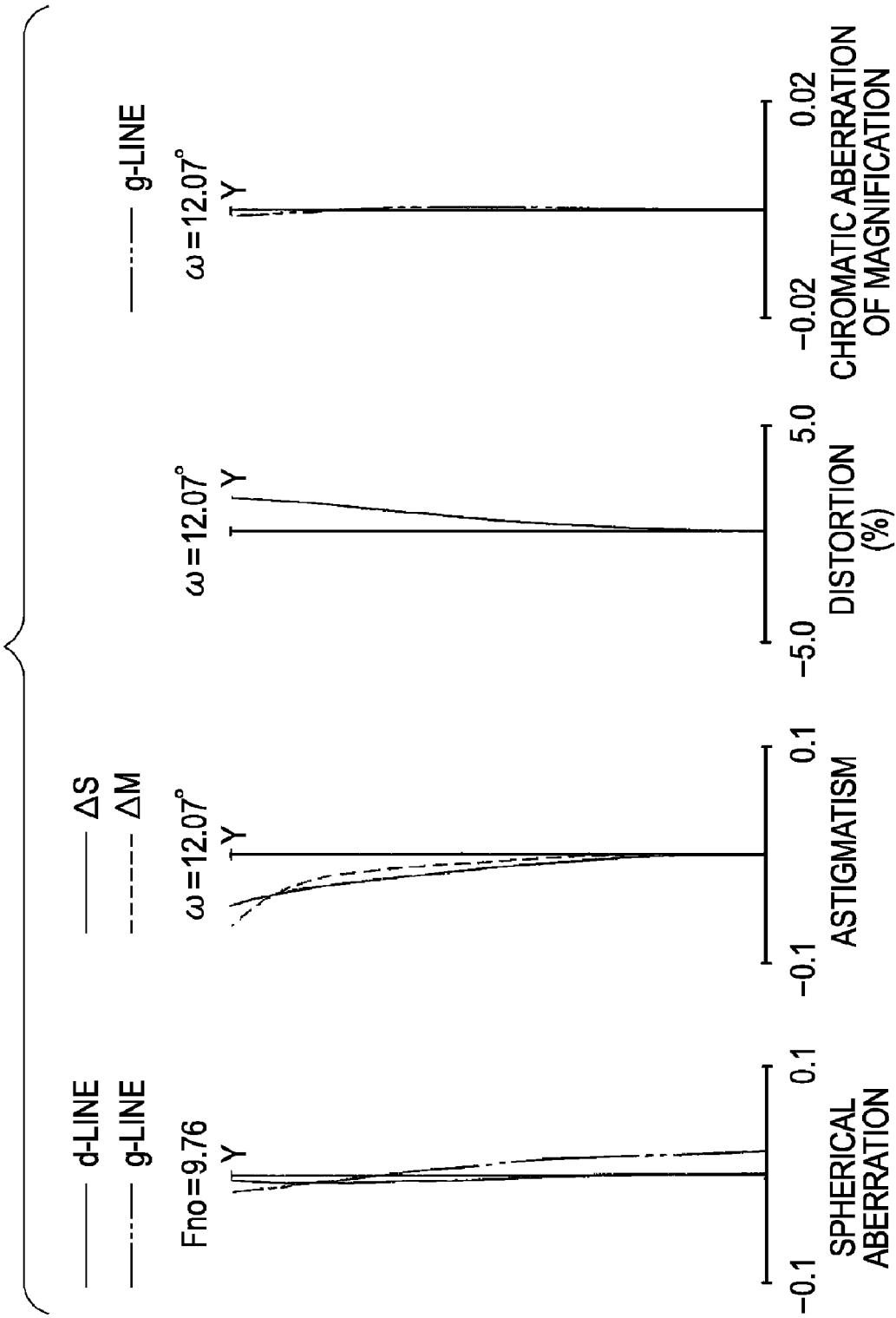

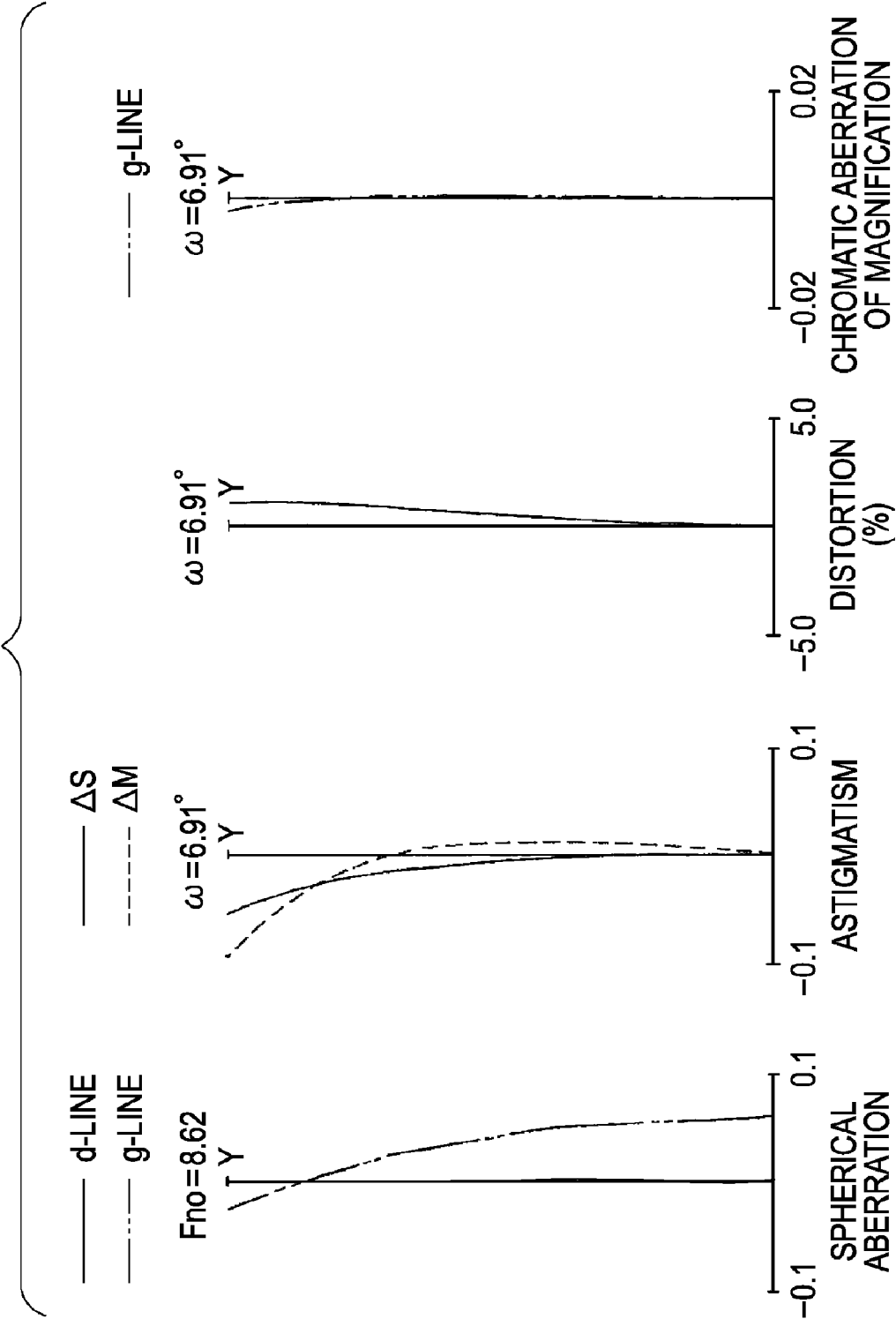

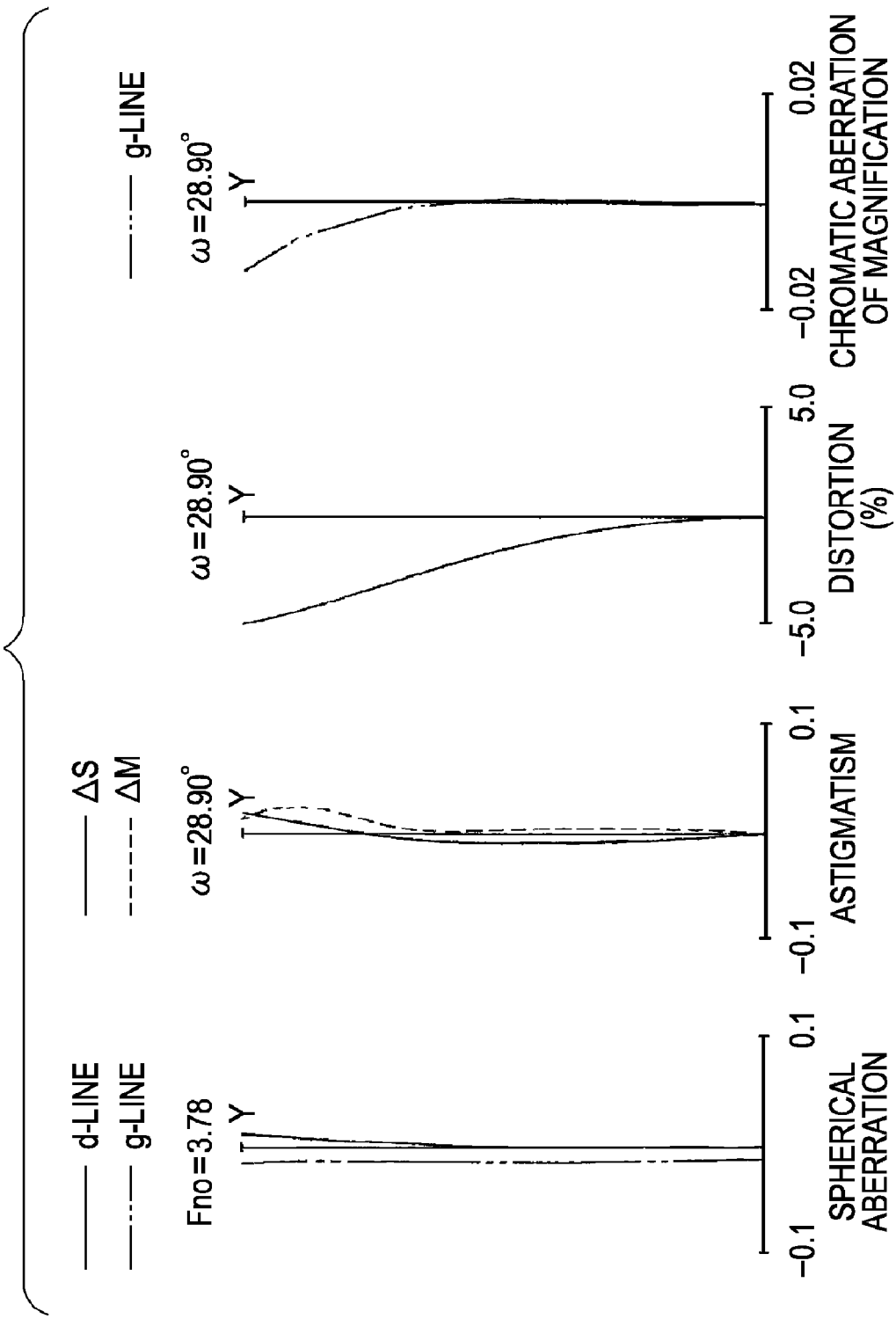

ZOOM LENS SYSTEM AND IMAGE PICKUP APPARATUS INCLUDING THE ZOOM LENS SYSTEM

BACKGROUND OF THE INVENTION

1. Field of the Invention

The present invention relates to a zoom lens system and further relates, though not exclusively, to an image pickup apparatus including the zoom lens system.

2. Description of the Related Art

Today, an image pickup apparatus using a solid-state image pickup device is becoming more sophisticated and compact. Examples of such an image pickup apparatus include a video camera, a digital still camera, a broadcasting camera, and a still camera using a silver salt film.

Accordingly, there is a demand for a compact zoom lens system which can be used as a photographic optical system for such an image pickup apparatus and has a short overall lens length while being capable of providing a high zoom ratio.

A four-unit zoom lens system is known as a compact zoom lens system having a high zoom ratio. The four-unit zoom lens system includes, in order from an object side to an image side, four lens units of positive, negative, positive, and positive refractive power and performs zooming by moving these lens units (see, for example, Japanese Patent Laid-Open No. 3-296706, U.S. Pat. No. 6,975,461, and Japanese Patent Laid-Open No. 2004-94233).

Also, a four-unit zoom lens system including a second lens unit composed of a pair of negative and positive lens elements is known (see, for example, U.S. Pat. No. 6,069,743 and U.S. Pat. No. 6,577,450).

To achieve both compactness of a camera and a higher zoom ratio of a zoom lens system, a retractable zoom lens system is used these days. The retractable zoom lens system refers to a zoom lens system in which, in a non-use mode (non-photographing mode), distances between adjacent lens units are reduced to distances that are different from those in a photographing mode. This can reduce the amount of protrusion of lens elements from the camera body.

Generally, as the number of lens elements included in each lens unit of a zoom lens system increases, the length of each lens unit on the optical axis increases.

At the same time, as the amount of movement of each lens unit for zooming or focusing increases, the overall lens length increases. This results in an increased length of the retractable barrel.

It is important for a zoom lens system for image pickup apparatuses to reduce the size of the entire lens system while providing a predetermined zoom ratio and good optical performance throughout the entire zoom range. Therefore, one can appropriately define the movement of each lens unit for zooming, the refractive power of each lens unit, and the lens configuration of each lens unit. For example, increasing the refractive power of each lens unit can reduce the overall lens length, as the amount of movement of each lens unit during zooming is reduced. However, simply increasing the refractive power of each lens unit causes larger variations in aberration associated with zooming, and makes it difficult to effectively correct the aberration.

In other words, while there is a trade-off between compactness and good optical performance, it is important for the zoom lens system to achieve both.

SUMMARY OF THE INVENTION

At least one exemplary embodiment is directed to a zoom lens, which can be used in various image pickup apparatuses (e.g., a video camera, a film camera, a broadcasting camera, and a digital still camera).

At least one exemplary embodiment of the present invention is directed to a zoom lens system capable of achieving a high zoom ratio and high optical performance throughout the entire zoom range while having a simple lens configuration and compact size.

According to an aspect of at least one exemplary embodiment of the present invention, a zoom lens system includes, in order from an object side to an image side, a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The following conditions are satisfied:

$$-2.0 < f2/fw < -1.1$$

$$4.5 < ft/fw < 7.5$$

$$-1.2 < f2lgn/fw < -0.6$$

where f2lgn is the focal length of the negative lens element in the second lens unit; f2 is the focal length of the second lens unit; and fw and ft are the focal lengths of the entire lens system at the wide-angle end and the telephoto end, respectively.

According to another aspect of at least one exemplary embodiment of the present invention, a zoom lens system includes, in order from an object side to an image side, a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The following condition is satisfied:

$$17 < (v11+v22)/2 < 25$$

where v11 and v22 are Abbe numbers of materials of the negative lens element in the first lens unit and the positive lens element in the second lens unit, respectively.

According to another aspect of at least one exemplary embodiment the present invention, a zoom lens system includes, in order from an object side to an image side, a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The negative lens element in the second lens unit is an aspheric lens element. The following conditions are satisfied:

$$0.7<(R21a+R21b)/(R21a-R21b)<1.2$$

$$-7<(R21b+R22a)/(R21b-R22a)<-3.5$$

where R21a and R21b are the curvature radii of surfaces on the object side and the image side of the negative lens element in the second lens unit, respectively; and R22a is the curvature radius of a surface on the object side of the positive lens element in the second lens unit.

According to another aspect of at least one exemplary embodiment of the present invention, an image pickup apparatus includes a solid-state image pickup device and a zoom lens system configured to guide light from an object to the solid-state image pickup device. In order from an object side to an image side, the zoom lens system includes a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The following conditions are satisfied:

$$-2.0<f2/fw<-1.1$$

$$4.5<ft/fw<7.5$$

$$-1.2<f2lgn/fw<-0.6$$

where f2lgn is the focal length of the negative lens element in the second lens unit; f2 is the focal length of the second lens unit; and fw and ft are the focal lengths of the entire lens system at the wide-angle end and the telephoto end, respectively.

According to another aspect of at least one exemplary embodiment of the present invention, an image pickup apparatus includes a solid-state image pickup device and a zoom lens system configured to guide light from an object to the solid-state image pickup device. In order from an object side to an image side, the zoom lens system includes a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The following condition is satisfied:

$$17<(v11+v22)/2<25$$

where v11 and v22 are Abbe numbers of materials of the negative lens element in the first lens unit and the positive lens element in the second lens unit, respectively.

According to another aspect of at least one exemplary embodiment of the present invention, an image pickup apparatus includes a solid-state image pickup device and a zoom lens system configured to guide light from an object to the solid-state image pickup device. In order from an object side to an image side, the zoom lens system includes a first lens unit of positive refractive power, a second lens unit of negative refractive power, a third lens unit of positive refractive power, and a fourth lens unit of positive refractive power. The first lens unit is positioned closer to the object side at a telephoto end than at a wide-angle end. A distance between the first lens unit and the second lens unit is larger at the telephoto end than at the wide-angle end. A distance between the second lens unit and the third lens unit is smaller at the telephoto end than at the wide-angle end. A distance between the third lens unit and the fourth lens unit is larger at the telephoto end than at the wide-angle end. The first lens unit includes a negative lens element and a positive lens element. The second lens unit includes a negative lens element and a positive lens element in this order from the object side to the image side. The negative lens element in the second lens unit is an aspheric lens element. The following conditions are satisfied:

$$0.7<(R21a+R21b)/(R21a-R21b)<1.2$$

$$-7<(R21b+R22a)/(R21b-R22a)<-3.5$$

where R21a and R21b are the curvature radii of surfaces on the object side and the image side of the negative lens element in the second lens unit, respectively; and R22a is the curvature radius of a surface on the object side of the positive lens element in the second lens unit.

Thus, at least one exemplary embodiment of the present invention is directed to a zoom lens system capable of achieving a high zoom ratio and high optical performance throughout the entire zoom range while having a simple lens configuration and compact size. Moreover, by incorporating the zoom lens system of the exemplary embodiment into an image pickup apparatus, such as a digital still camera, it is possible to realize a compact image pickup apparatus having high optical performance.

Further features of the present invention will become apparent from the following description of exemplary embodiments with reference to the attached drawings.

BRIEF DESCRIPTION OF THE DRAWINGS

FIG. 2A is a graph illustrating various aberrations of the zoom lens system according to the first exemplary embodiment at the wide-angle end.

FIG. 2C is a graph illustrating various aberrations of the zoom lens system according to the first exemplary embodiment at the telephoto end.

FIG. 4A is a graph illustrating various aberrations of the zoom lens system according to the second exemplary embodiment at the wide-angle end.

FIG. 4B is a graph illustrating various aberrations of the zoom lens system according to the second exemplary embodiment at the middle zoom position.

FIG. 4C is a graph illustrating various aberrations of the zoom lens system according to the second exemplary embodiment at the telephoto end.

FIG. 6A is a graph illustrating various aberrations of the zoom lens system according to the third exemplary embodiment at the wide-angle end.

DESCRIPTION OF THE EMBODIMENTS

Figure 1A:
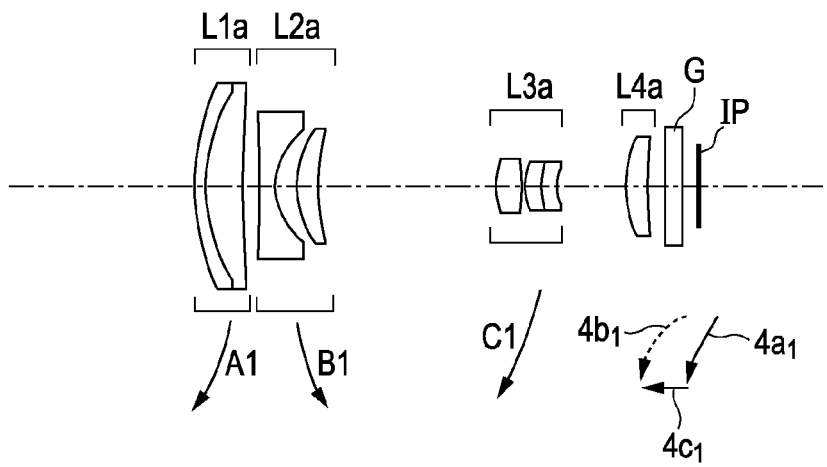
FIG. 1A illustrates a cross section of a zoom lens system according to a first exemplary embodiment at the wide-angle end.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Exemplary embodiments of a zoom lens system and an image pickup apparatus including the zoom lens system according to at least one exemplary embodiment of the present invention will now be described.

Figure 1B:
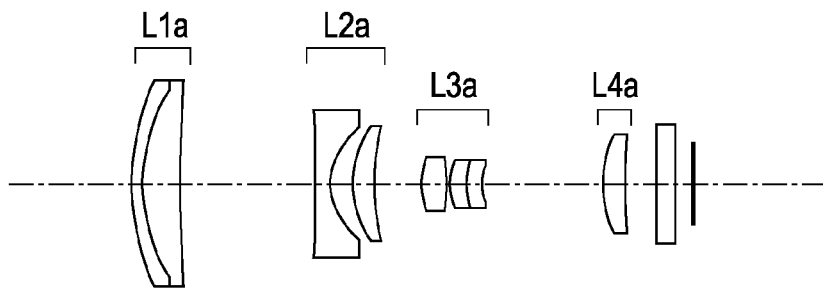
FIG. 1B illustrates a cross section of the zoom lens system according to the first exemplary embodiment at the middle zoom position.
Figure 1C:
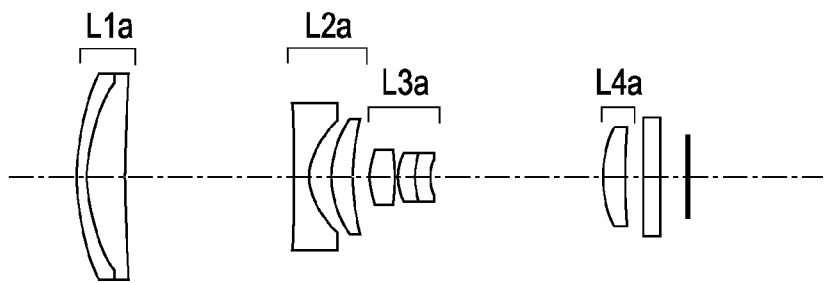
FIG. 1C illustrates a cross section of the zoom lens system according to the first exemplary embodiment at the telephoto end.
Figure 2B:
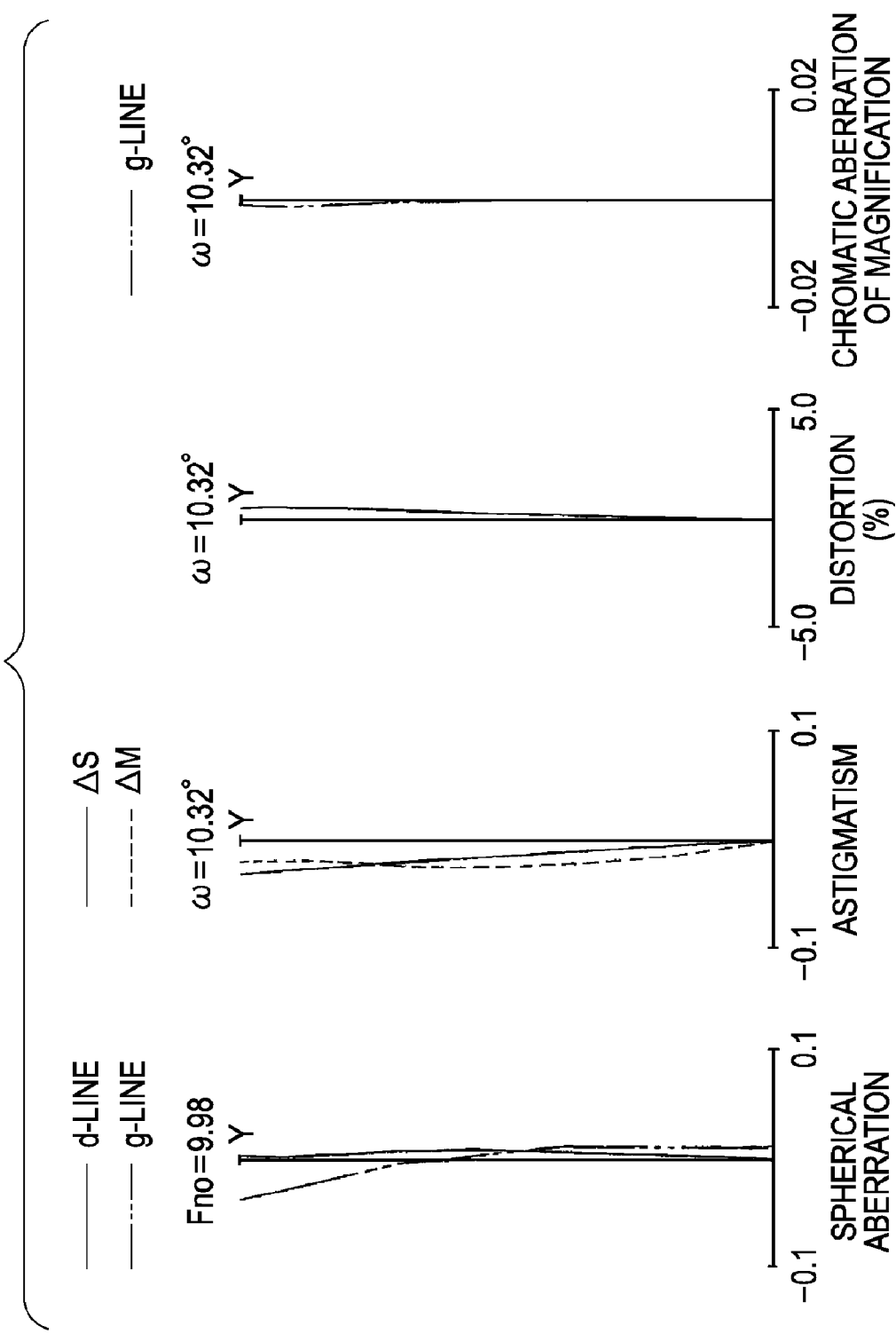
FIG. 2B is a graph illustrating various aberrations of the zoom lens system according to the first exemplary embodiment at the middle zoom position.

FIG. 1A, FIG. 1B, and FIG. 1C illustrate cross sections of a zoom lens system according to a first exemplary embodiment of the present invention at the wide-angle end (short focal length end), middle zoom position, and telephoto end (long focal length end), respectively. FIG. 2A, FIG. 2B, and FIG. 2C are graphs illustrating various aberrations of the zoom lens system according to the first exemplary embodiment at the wide-angle end, middle zoom position, and telephoto end, respectively. The zoom lens system of the first exemplary embodiment has a zoom ratio of 4.79 and an F-number of 3.28 to 5.74.

Figure 3A:
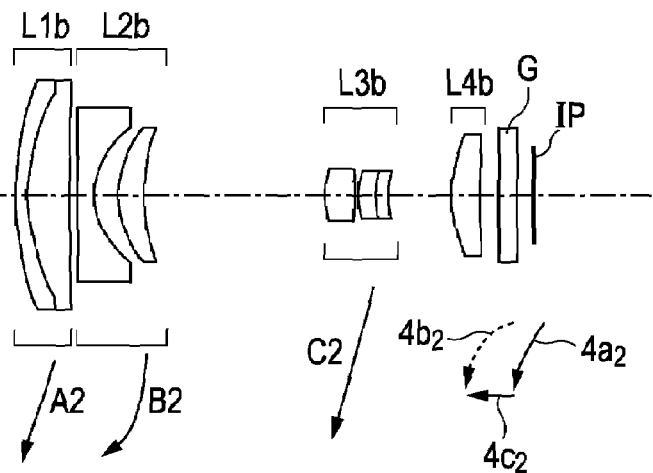
FIG. 3A illustrates a cross section of a zoom lens system according to a second exemplary embodiment at the wide-angle end.
Figure 3B:
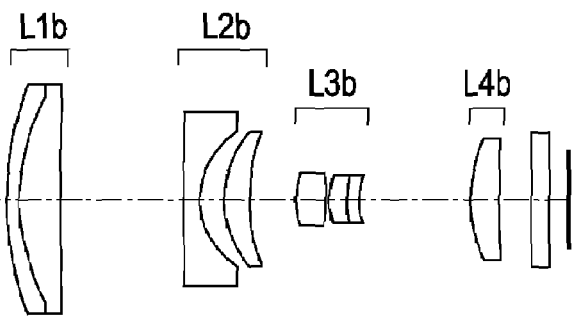
FIG. 3B illustrates a cross section of the zoom lens system according to the second exemplary embodiment at the middle zoom position.
Figure 3C:
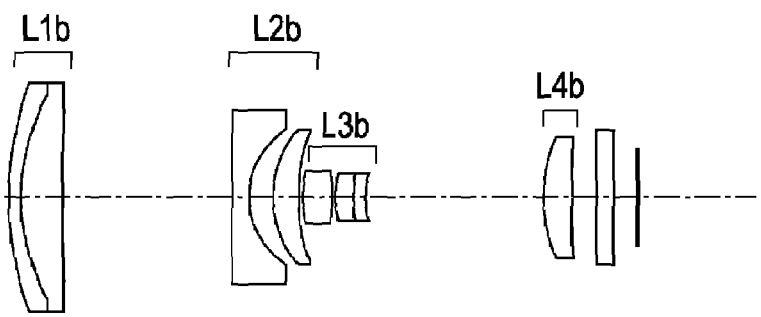
FIG. 3C illustrates a cross section of the zoom lens system according to the second exemplary embodiment at the telephoto end.

FIG. 3A, FIG. 3B, and FIG. 3C illustrate cross sections of a zoom lens system according to a second exemplary embodiment of the present invention at the wide-angle end, middle zoom position, and telephoto end, respectively. FIG. 4A, FIG. 4B, and FIG. 4C are graphs illustrating various aberrations of the zoom lens system according to the second exemplary embodiment at the wide-angle end, middle zoom position, and telephoto end, respectively. The zoom lens system of the second exemplary embodiment has a zoom ratio of 4.78 and an F-number of 3.60 to 6.31.

Figure 5A:
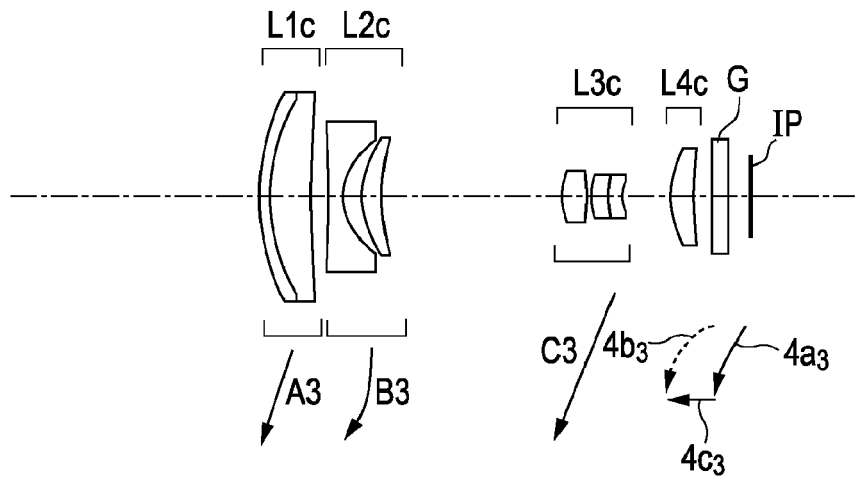
FIG. 5A illustrates a cross section of a zoom lens system according to a third exemplary embodiment at the wide-angle end.
Figure 5B:
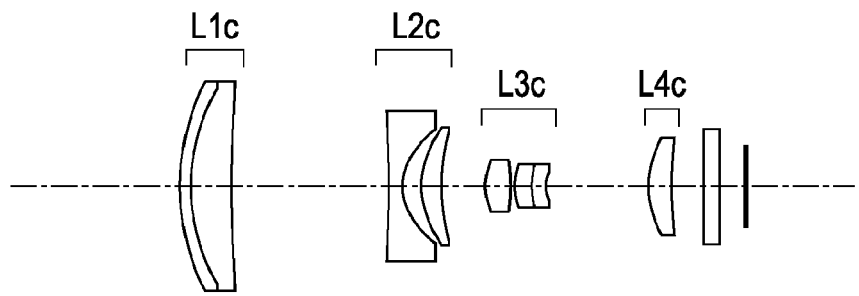
FIG. 5B illustrates a cross section of the zoom lens system according to the third exemplary embodiment at the middle zoom position.
Figure 5C:
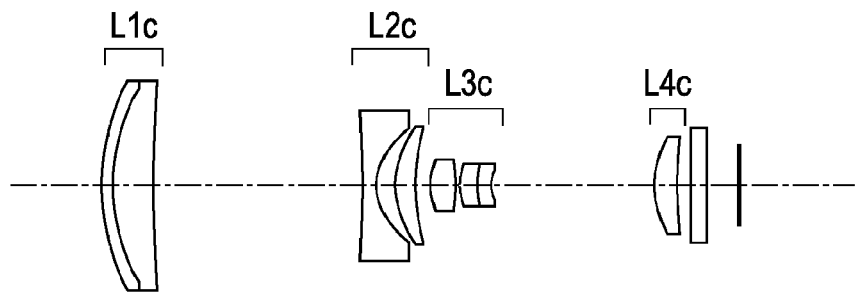
FIG. 5C illustrates a cross section of the zoom lens system according to the third exemplary embodiment at the telephoto end.
Figure 6B:
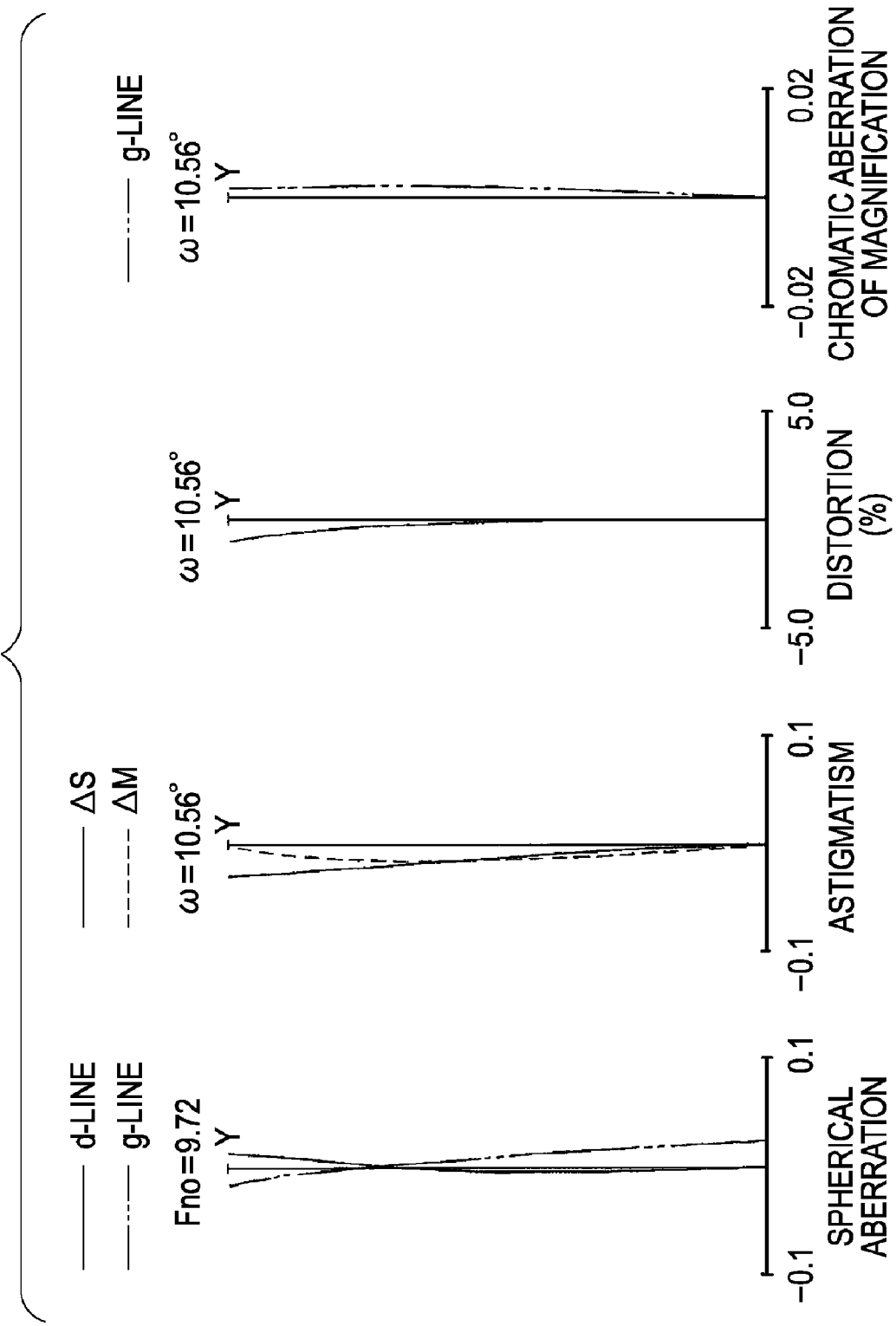
FIG. 6B is a graph illustrating various aberrations of the zoom lens system according to the third exemplary embodiment at the middle zoom position.
Figure 6C:
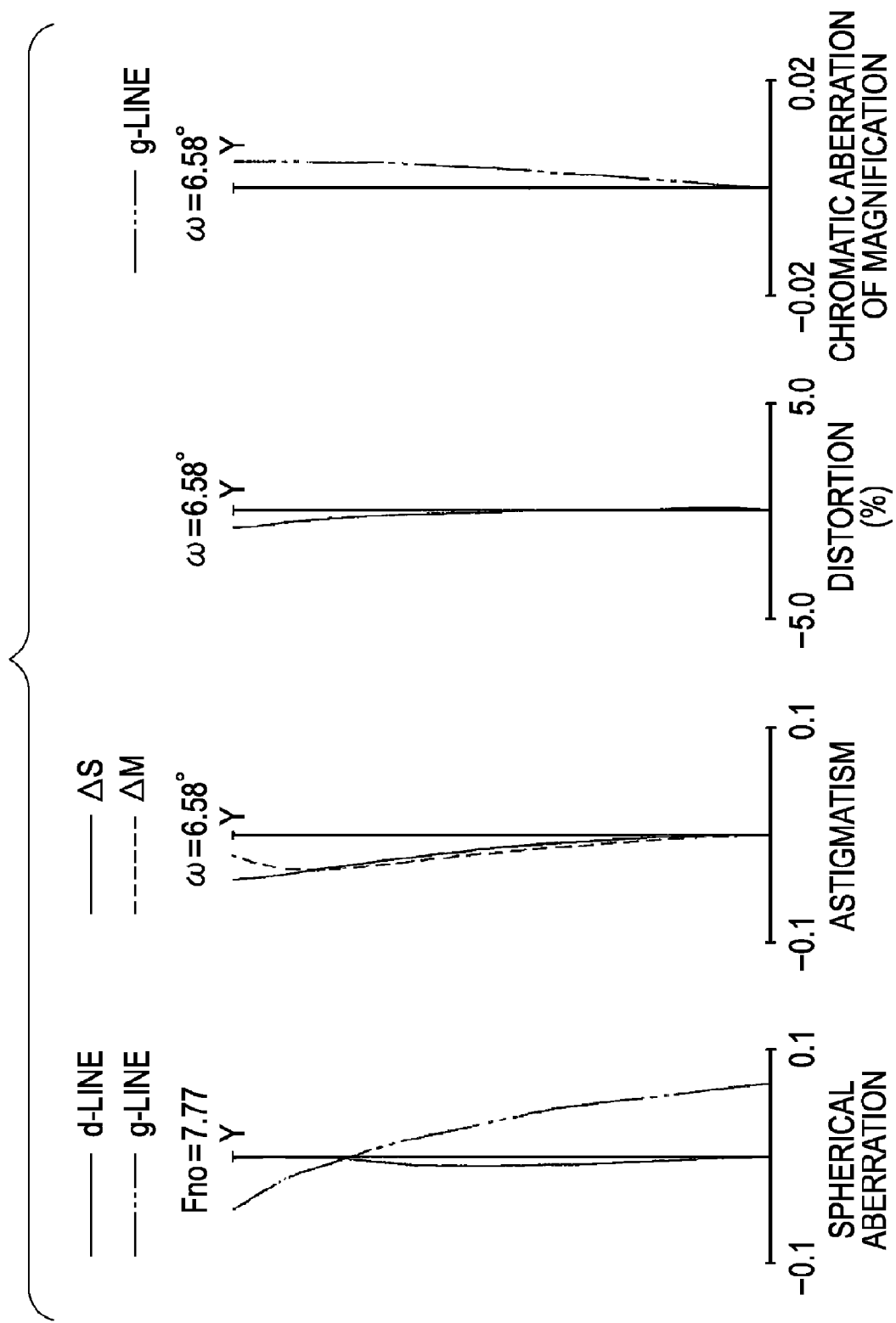
FIG. 6C is a graph illustrating various aberrations of the zoom lens system according to the third exemplary embodiment at the telephoto end.

FIG. 5A, FIG. 5B, and FIG. 5C illustrate cross sections of a zoom lens system according to a third exemplary embodiment of the present invention at the wide-angle end, middle zoom position, and telephoto end, respectively. FIG. 6A, FIG. 6B, and FIG. 6C are graphs illustrating various aberrations of the zoom lens system according to the third exemplary embodiment at the wide-angle end, middle zoom position, and telephoto end, respectively. The zoom lens system of the third exemplary embodiment has a zoom ratio of 4.79 and an F-number of 3.28 to 6.02.

Figure 7:
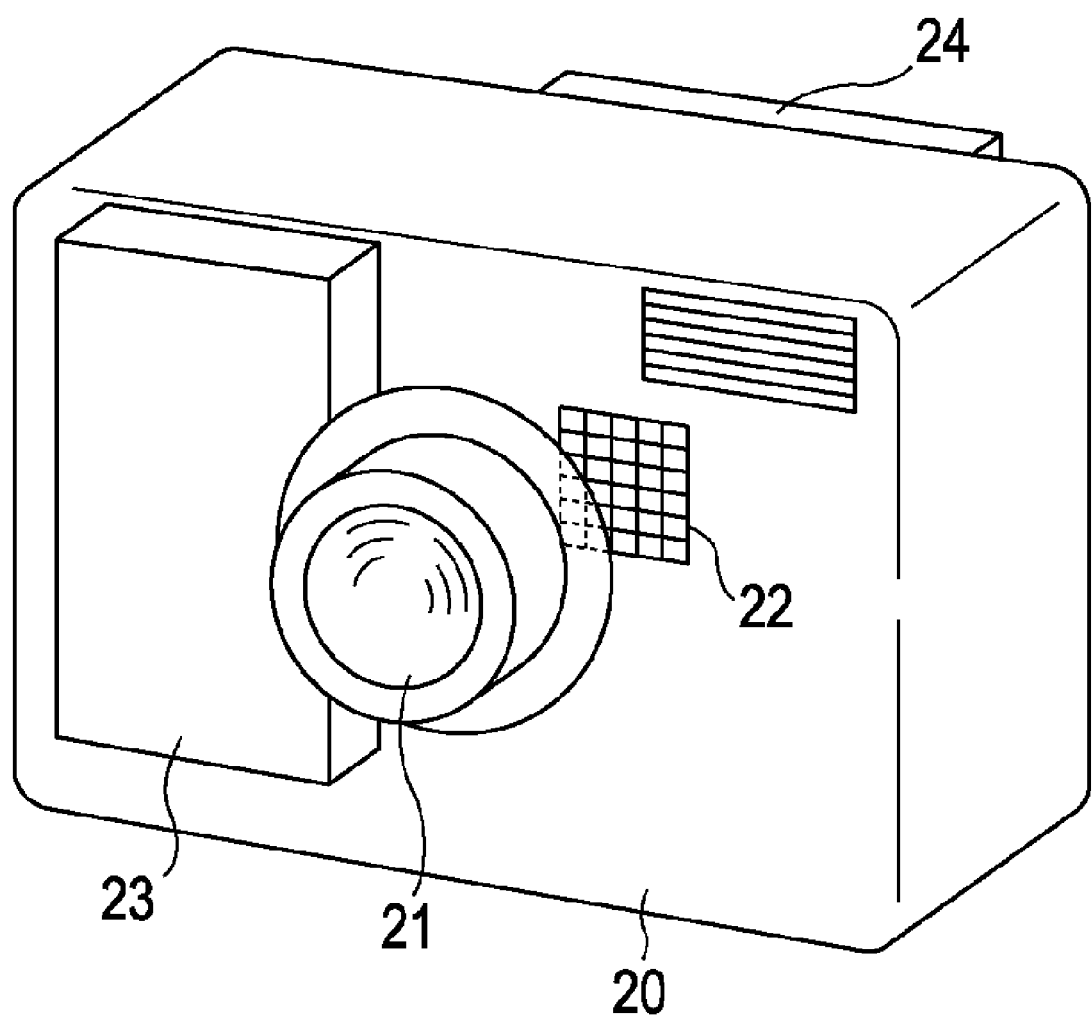
FIG. 7 is a schematic diagram illustrating a main part of an image pickup apparatus in accordance with at least one exemplary embodiment of the present invention.

FIG. 7 is a schematic diagram illustrating a main part of an image pickup apparatus including the zoom lens system in accordance with at least one exemplary embodiment of the present invention.

A zoom lens system of at least one exemplary embodiment is a photographic lens system for an image pickup apparatus, such as a digital still camera or a film camera. In each of the cross sectional views (FIGS. 1A through 1C, FIGS. 3A through 3C, and FIGS. 5A through 5C), the left side corresponds to the object side (or front side), and the right side corresponds to the image side (or rear side).

In the cross sectional views, reference character L1$a$-$c$ denotes a first lens unit of positive refractive power (refractive power=optical power=inverse of focal length), reference character L2$a$-$c$ denotes a second lens unit of negative refractive power, reference character L3$a$-$c$ denotes a third lens unit of positive refractive power, and reference character L4$a$-$c$ denotes a fourth lens unit of positive refractive power. Reference character G denotes an optical block, such as an optical filter, a face plate, a crystal low-pass filter, or an infrared cut filter.

Reference character IP denotes an image plane. If the zoom lens system is used as a photographic optical system for a video camera or a digital still camera, the image plane IP corresponds to an imaging surface of a solid-state image pickup device (photoelectric converter), such as a charge-coupled device (CCD) sensor or a complementary metal oxide semiconductor (CMOS) sensor.

In each of the aberration graphs (FIGS. 2A through 2C, FIGS. 4A through 4C, and FIGS. 6A through 6C), Fno denotes an F-number, ω denotes a half field angle, and ΔM and ΔS denote a meridional image plane and a sagittal image plane for a d-line, respectively. A g-line represents chromatic aberration of magnification. The Y-axis in the spherical aberration's graph is entrance pupil radius, the Y-axis in the astigmatism's, distortion's and chromatic aberration of magnification's graphs is image height.

In each exemplary embodiment, a zoom position at the wide-angle end or telephoto end refers to a zoom position when a magnification-varying lens unit is located at one end of a mechanically movable range along the optical axis.

In each exemplary embodiment, during zooming from the wide-angle end to the telephoto end, the lens units L1a-c through L4a-c move (A1-A3; B1-B3; C1-C3; 4a1-3, 4b1-3, and 4c1-3) as indicated by arrows.

Specifically, the first lens unit L1a-c moves (A1-A3) straight toward the object side or moves along a locus convex toward the object side. The first lens unit L1a-c moves to be closer to the object side at the telephoto end than at the wide-angle end. The second lens unit L2a-c moves (B1-B3) straight toward the image side or moves along a locus convex toward the image side. The second lens unit L2a-c moves to be closer to the image side at the telephoto end than at the wide-angle end. The third lens unit L3a-c moves (C1-C3) straight toward the object side. The fourth lens unit L4a-c moves (4a-3) along a locus convex toward the object side.

The lens units L1a-c through L4a-c individually move such that a distance between the first lens unit L1a-c and the second lens unit L2a-c is larger at the telephoto end than at the wide-angle end, a distance between the second lens unit L2a-c and the third lens unit L3a-c is smaller at the telephoto end than at the wide-angle end, and a distance between the third lens unit L3a-c and the fourth lens unit L4a-c is larger at the telephoto end than at the wide-angle end.

In each exemplary embodiment, a refractive power distribution of substantially retrofocus type can be implemented at the wide-angle end, while a refractive power distribution of substantially telephoto type can be implemented at the telephoto end. This allows a zoom lens system having a high zoom ratio to be achieved.

Moreover, since all the lens units are moved to compensate for image plane variations associated with zooming and magnification varying operation, an efficient distribution of refractive power can be facilitated.

Furthermore, since the overall length of the optical system can be reduced at the wide-angle end, a compact zoom lens system that has a high zoom ratio can be achieved and used in an image pickup apparatus, for example used in a digital camera.

Each exemplary embodiment adopts a rear-focusing type zoom lens system in which the fourth lens unit L4a-c is moved along the optical axis to achieve focusing.

To perform focusing from an infinite object to a close object at the telephoto end, the fourth lens unit L4a-c is moved forward as indicated by arrow 4c1-3. Solid curve 4a1-3 and dotted curve 4b1-3 represent the movements of the fourth lens unit L4a-c during focusing on an infinite object and a close object, respectively, for compensating for image plane variations associated with zooming from the wide-angle end to the telephoto end.

In at least one exemplary embodiment, the fourth lens unit L4a-c, for example which can be light in weight, is moved to facilitate quick focus adjustment.

In at least a few exemplary embodiments, each lens unit includes the following lens elements arranged in order from the object side to the image side. The first lens unit L1a-c includes a cemented lens component formed by cementing a negative lens element and a positive lens element. This cemented lens component is a meniscus lens component having a convex surface on the object side. Although, in at least a few exemplary embodiments, the cemented lens of the first lens unit includes negative lens element and the positive lens element in order from the object side to the image side, the present invention is not limited to that. The positive lens element may be arranged at the object side rather than the negative lens element. The positive lens element and the negative lens element may not be cemented. Unless otherwise specified, in at least a few exemplary embodiments, the term "lens element" means neither a cemented lens nor a joined lens, and means a refractive element, which comprised single glass material. Note that an antireflection film may be formed on the surface of the lens element.

The second lens unit L2a-c includes a negative meniscus lens element having a concave surface on the image side or a negative lens element having concave surfaces on both sides, and a positive lens element having a convex surface on the object side. One surface on the image side or both surfaces of the negative lens element are aspheric.

The third lens unit L3a-c includes a positive lens element having convex surfaces on both sides and a cemented lens component formed by cementing a positive lens element and a negative lens element. This cemented lens component is a meniscus lens component having a convex surface on the object side.

The fourth lens unit L4a-c includes a positive meniscus lens element having a convex surface on the object side.

In at least one exemplary embodiment, the zoom lens system, which includes a very small number of lens elements as described above, can provide high optical performance while facilitating compactness of the optical system.

In at least one exemplary embodiment, the first lens unit L1a-c of positive refractive power has the largest effective aperture. Since this first lens unit L1a-c includes only two lens elements to contribute to the reduced overall number of lens elements, compactness of the optical system can be achieved. Moreover, since the two lens elements of the first lens unit L1a-c includes both the positive and negative lens elements, effective correction for chromatic aberrations can be made. This configuration of the first lens unit L1a-c enables particularly effective correction for chromatic aberration of magnification from the wide-angle end to the telephoto end and longitudinal chromatic aberrations at the telephoto end.

The second lens unit L2a-c has a strong negative refractive power and performs part of magnification varying operation. This can cause a high degree of aberrations to occur in the second lens unit L2a-c. However, the second lens unit L2a-c, which includes two lens groups composed of two lens elements, enables effective correction for aberrations while allowing a strong negative refractive power to be maintained. While having a particularly simple lens configuration, the second lens unit L2a-c can contribute to the achievement of a zoom lens system capable of providing a high zoom ratio and high optical performance.

The third lens unit L3a-c of positive refractive power is configured such that longitudinal aberrations that occur in the positive lens elements are corrected by the negative lens element. Thus, good optical performance can be achieved with a small number of lens elements.

The fourth lens unit L4a-c of positive refractive power includes a lens element having a relatively weak refractive power. This allows effective correction for longitudinal aberrations unable to be corrected by the third lens unit L3a-c and also for various oblique aberrations.

Thus, each of the above-described exemplary embodiments can provide a fast zoom lens system having a zoom ratio of about five and capable of providing high optical performance while using only a small number of lens elements and achieving a short overall lens length.

To achieve good optical performance or to facilitate compactness of the entire lens system, the zoom lens system of at least one exemplary embodiment is configured to satisfy at least one of the following conditions. This allows the achievement of effects corresponding to each condition:

$$-2.0 < f2/fw < -1.1 \tag{1}$$

$$4.5 < ft/fw < 7.5 \tag{2}$$

$$-1.2 < f21gn/fw < -0.6 \tag{3}$$

$$4.0 < f1/fw < 8.2 \tag{4}$$

$$17 < (\nu11+\nu22)/2 < 25 \tag{5}$$

$$0.7 < (R21a+R21b)/(R21a-R21b) < 1.2 \tag{6}$$

$$-7 < (R21b+R22a)/(R21b-R22a) < -3.5 \tag{7}$$

$$3.7 < N21+N22 < 4.0 \tag{8}$$

where f2lgn is the focal length of the negative lens element in the second lens unit L2a-c; f1 and f2 are the focal lengths of the first and second lens units L1a-c and L2a-c, respectively; fw and ft are the focal lengths of the entire lens system at the wide-angle end and telephoto end, respectively; $\nu11$ and $\nu22$ are Abbe numbers of materials of the negative lens element in the first lens unit L1a-c and the positive lens element in the second lens unit L2a-c, respectively; N21 and N22 are refractive indexes of materials of the negative lens element and positive lens element in the second lens unit L2a-c, respectively; R21a and R21b are the curvature radii of surfaces on the object side and image side of the negative lens element in the second lens unit L2a-c, respectively; and R22a is the curvature radius of a surface on the object side of the positive lens element in the second lens unit L2a-c.

Each conditional expression will now be described from technical points of view.

Conditional expression (1) relates to a value obtained by normalizing the focal length of the second lens unit L2a-c to the focal length of the entire lens system at the wide-angle end. If the refractive power of the second lens unit L2a-c becomes weak and exceeds the upper limit of conditional expression (1), the size of the entire lens system increases. If the refractive power of the second lens unit L2a-c becomes too strong and exceeds the lower limit of conditional expression (1), it becomes difficult to correct coma aberrations on the telephoto side. Moreover, an increased uneven thickness ratio of the negative lens element in the second lens unit L2a-c causes difficulties in manufacture.

Conditional expression (2) relates to the zoom ratio of the entire lens system. Conditional expression (2) defines a zoom range in at least one exemplary embodiment and thereby ensures a predetermined zoom ratio. The zoom ratio depends on, for example, the refractive power and moving range of the magnification-varying lens unit.

Conditional expression (3) relates to a value obtained by normalizing the focal length of the negative lens element in the second lens unit L2a-c to the focal length of the entire lens system. If the refractive power of the negative lens element becomes weak and exceeds the upper limit of conditional expression (3), the front lens diameter increases. This can cause an increase in the size of the entire lens system. If the refractive power of the negative lens element becomes too strong and exceeds the lower limit of conditional expression (3), it becomes difficult to correct coma aberrations in the telephoto area. Moreover, an increased uneven thickness ratio of the negative lens element in the second lens unit L2a-c causes difficulties in manufacture.

Conditional expression (4) relates to a value obtained by normalizing the focal length of the first lens unit L1a-c to the focal length of the entire lens system at the wide-angle end. If the refractive power of the first lens unit L1a-c becomes too weak and exceeds the upper limit of conditional expression (4), F-number fluctuations associated with zooming increase. This can make it difficult to ensure a desired F-number in the telephoto area. If the refractive power of the first lens unit L1a-c becomes too strong and exceeds the lower limit of conditional expression (4), the front lens diameter increases. This can cause an increase in the size of the entire lens system.

Conditional expression (5) relates to the average value of Abbe numbers of materials of the negative lens element in the first lens unit L1a-c and the positive lens element in the second lens unit L2a-c. If the upper or lower limit of conditional expression (5) is exceeded, it becomes difficult to effectively correct chromatic aberrations in the wide-angle area or telephoto area.

Conditional expression (6) relates to the shape factor of the negative lens element in the second lens unit L2a-c. Conditional expression (7) relates to the shape factor of an air lens between the negative and positive lens elements in the second lens unit L2a-c. If the upper or lower limit of conditional expression (6) or (7) is exceeded, it becomes difficult to effectively correct coma flare around the perimeter of the screen in the wide-angle area.

Conditional expression (8) relates to the sum of the refractive indexes of materials of the negative and positive lens elements in the second lens unit L2a-c. When lens elements made of glass satisfying conditional expression (8) are used with a power distribution satisfying conditional expressions (1) and (3), easier manufacture and effective correction for aberrations can be achieved. If the upper limit of conditional expression (8) is exceeded, the excessively high refractive index causes difficulties in manufacture. If the lower limit of conditional expression (8) is exceeded, the excessively low refractive index causes increases in the thickness of the second lens unit L2a-c, the front lens diameter, and the size of the entire lens system.

In at least one exemplary embodiment, the numerical range of each of conditional expressions (1) through (8) can be defined as follows:

$$-1.8 < f2/fw < -1.3 \tag{1a}$$

$$4.7 < ft/fw < 6.0 \tag{2a}$$

$-1.1 < f2lgn/fw < -0.8$ (3a)

$5.5 < f1/fw < 7.9$ (4a)

$20 < (v11+v22)/2 < 24$ (5a)

$0.8 < (R21a+R21b)/(R21a-R21b) < 1.1$ (6a)

$-5.5 < (R21b+R22a)/(R21b-R22a) < -3.6$ (7a)

$3.7 < N21+N22 < 3.8$ (8a)

As described above, the lens configuration of each lens unit, the position of the aspheric surface, and the movement of each lens unit during zooming are appropriately defined in each exemplary embodiment. Thus, it is possible to provide a fast zoom lens system having a zoom ratio of about five or six and capable of providing high optical performance while using only a small number of lens elements and achieving a short overall lens length. The zoom lens can be used in an image pickup apparatus (e.g., a digital still camera).

Next, numerical examples of exemplary embodiments of the present invention will be described. In each numerical example, "i" denotes the order of a surface from the object side, Ri denotes the curvature radius of the i-th lens surface (the i-th surface), Di denotes a distance between the i-th surface and the (i+1)-th surface, Ni denotes a refractive index with respect to the d-line, and νi denotes an Abbe number. In each numerical example, two surfaces closest to the image are surfaces of the optical block G.

An aspheric shape is expressed as follows:

$X = (h^2/R)/[1+\{131\ (1+k)(h/R)^2\}^{1/2}] + Ah^2 + Bh^4 + Ch^6 + Dh^8 + Eh^{10}$ where, with respect to a surface vertex, X is the amount of displacement in the direction of the optical axis at a height h from the optical axis; k is a conic constant; A, B, C, D, and E are aspheric coefficients of order 2, 4, 6, 8, and 10, respectively; and R is a paraxial curvature radius.

Additionally, "e-0X" means "$\times 10^{-X}$", f denotes a focal length, Fno denotes an F-number, and ω denotes a half field angle.

The relationship of the above-described conditional expressions and numerical examples will be shown in Table 1.

Numerical Example 1

| f = 6.45~30.88 | Fno = 3.28~5.74 | 2ω = 54.9~12.4 | |
|---|---|---|---|
| R1 = 21.262 | D1 = 0.80 | N1 = 1.846660 | ν1 = 23.9 |
| R2 = 14.820 | D2 = 3.20 | N2 = 1.696797 | ν2 = 55.5 |
| R3 = 145.686 | D3 = Variable | | |
| * R4 = −57.748 | D4 = 1.20 | N3 = 1.861530 | ν3 = 40.4 |
| * R5 = 5.324 | D5 = 1.94 | | |
| R6 = 9.241 | D6 = 1.70 | N4 = 1.922860 | ν4 = 18.9 |
| R7 = 20.001 | D7 = Variable | | |
| * R8 = 6.895 | D8 = 2.10 | N5 = 1.516330 | ν5 = 64.1 |
| R9 = −13.974 | D9 = 0.30 | | |
| R10 = 6.242 | D10 = 1.50 | N6 = 1.772499 | ν6 = 49.6 |
| R11 = 13.750 | D11 = 1.10 | N7 = 1.846660 | ν7 = 23.9 |
| R12 = 3.791 | D12 = Variable | | |
| * R13 = 10.057 | D13 = 1.90 | N8 = 1.583126 | ν8 = 59.4 |
| R14 = 101.381 | D14 = Variable | | |
| R15 = ∞ | D15 = 1.30 | N9 = 1.516330 | ν9 = 64.1 |
| R16 = ∞ | | | |

-continued

Numerical Example 1

| \Focal Length Variable Spacing\ | 6.45 | 19.61 | 30.88 |
|---|---|---|---|
| D3 | 1.30 | 11.09 | 13.82 |
| D7 | 14.73 | 3.95 | 1.45 |
| D12 | 5.70 | 10.28 | 15.19 |
| D14 | 1.44 | 2.56 | 1.44 |

Aspheric Coefficients

| 4th surface: | k = 0.00000e+00 C = 0.00000e+00 | A = 0 D = 0.00000e+00 | B = 6.34186e−05 E = 0.00000e+00 |
|---|---|---|---|
| 5th surface: | k = −3.49961e+00 C = −6.03356e−05 | A = 0 D = 1.58479e−06 | B = 2.37000e−03 E = −1.64088e−08 |
| 8th surface: | k = −2.26447e+00 C = 4.68002e−06 | A = 0 D = −1.03392e−06 | B = 1.79021e−04 E = 0.00000e+00 |
| 13th surface: | k = 0.00000e+00 C = 1.75485e−06 | A = 0 D = 0.00000e+00 | B = 1.17574e−05 E = 0.00000e+00 |

Numerical Example 2

| f = 6.15~29.41 | Fno = 3.60~6.31 | 2ω = 57.1~13.0 | |
|---|---|---|---|
| R1 = 26.243 | D1 = 0.80 | N1 = 1.846660 | ν1 = 23.9 |
| R2 = 16.487 | D2 = 3.20 | N2 = 1.772499 | ν2 = 49.6 |
| R3 = 319.961 | D3 = Variable | | |
| R4 = 223.029 | D4 = 1.20 | N3 = 1.861530 | ν3 = 40.4 |
| * R5 = 5.250 | D5 = 1.88 | | |
| R6 = 7.696 | D6 = 1.90 | N4 = 1.922860 | ν4 = 18.9 |
| R7 = 12.255 | D7 = Variable | | |
| R8 = 7.056 | D8 = 2.30 | N5 = 1.603112 | ν5 = 60.6 |
| R9 = −27.965 | D9 = 0.10 | | |
| * R10 = 4.629 | D10 = 1.40 | N6 = 1.516330 | ν6 = 64.1 |
| R11 = 7.023 | D11 = 1.00 | N7 = 1.922860 | ν7 = 18.9 |
| R12 = 3.590 | D12 = Variable | | |
| * R13 = 10.540 | D13 = 2.20 | N8 = 1.743300 | ν8 = 49.3 |
| R14 = 143.641 | D14 = Variable | | |
| R15 = ∞ | D15 = 1.30 | N9 = 1.516330 | ν9 = 64.1 |
| R16 = ∞ | | | |

| \Focal Length Variable Spacing\ | 6.15 | 16.67 | 29.41 |
|---|---|---|---|
| D3 | 0.60 | 9.31 | 12.88 |
| D7 | 14.00 | 3.77 | 0.40 |
| D12 | 4.82 | 8.56 | 14.10 |
| D14 | 1.44 | 2.48 | 1.73 |

Aspheric Coefficients

| 5th surface: | k = −9.59561e−01 C = 9.61875e−06 | A = 0 D = −4.59901e−08 | B = 5.02248e−04 E = 2.29715e−09 |
|---|---|---|---|
| 10th surface: | k = 0.00000e+00 C = −3.33257e−05 | A = 0 D = −5.06616e−06 | B = −7.19750e−04 E = 0.00000e+00 |
| 13th surface: | k = 0.00000e+00 C = 3.10586e−06 | A = 0 D = 0.00000e+00 | B = −2.10520e−05 E = 0.00000e+00 |

Numerical Example 3

| f = 6.45~30.88 | Fno = 3.28~6.02 | 2ω = 54.9~12.4 | |
|---|---|---|---|
| R1 = 19.889 | D1 = 0.80 | N1 = 1.846660 | ν1 = 23.9 |
| R2 = 16.673 | D2 = 3.50 | N2 = 1.487490 | ν2 = 70.2 |
| R3 = 321.734 | D3 = Variable | | |
| * R4 = −75.058 | D4 = 1.20 | N3 = 1.861530 | ν3 = 40.4 |
| * R5 = 5.223 | D5 = 1.47 | | |
| R6 = 8.196 | D6 = 1.70 | N4 = 1.846660 | ν4 = 23.8 |
| R7 = 23.697 | D7 = Variable | | |
| * R8 = 6.141 | D8 = 2.10 | N5 = 1.516330 | ν5 = 64.1 |
| R9 = −14.302 | D9 = 0.30 | | |

-continued

Numerical Example 3

| R10 = 6.379 | D10 = 1.50 | N6 = 1.772499 | ν6 = 49.6 |
| R11 = 11.201 | D11 = 1.10 | N7 = 1.846660 | ν7 = 23.9 |
| R12 = 3.540 | D12 = Variable | | |
| * R13 = 10.057 | D13 = 1.90 | N8 = 1.583126 | ν8 = 59.4 |
| R14 = 101.381 | D14 = Variable | | |
| R15 = ∞ | D15 = 1.30 | N9 = 1.516330 | ν9 = 64.1 |
| R16 = ∞ | | | |

| \Focal Length Variable Spacing\ | 6.45 | 19.11 | 30.88 |
|---|---|---|---|
| D3 | 1.30 | 12.64 | 16.99 |
| D7 | 14.80 | 3.64 | 1.32 |
| D12 | 4.15 | 8.91 | 14.33 |
| D14 | 1.44 | 2.56 | 1.06 |

TABLE 1

Conditional Expression

| | 1 $f2/fw$ | 2 $ft/fw$ | 3 $f2lgn/fw$ | 4 $f1/fw$ | 5 $(\nu 11 + \nu 22)/2$ | 6 $(R21a + R21b)/(R21a - R21b)$ | 7 $(R21b + R22a)/(R21b - R22a)$ | 8 $N21 + N22$ |
|---|---|---|---|---|---|---|---|---|
| Numerical Example 1 | −1.44 | 4.79 | −0.87 | 6.09 | 21.415 | 0.83 | −3.7 | 3.784 |
| Numerical Example 2 | −1.59 | 4.78 | −1.02 | 6.36 | 21.415 | 1.05 | −5.3 | 3.784 |
| Numerical Example 3 | −1.66 | 4.79 | −0.87 | 7.75 | 23.93 | 0.87 | −4.5 | 3.709 |

Next, an exemplary digital still camera using a zoom lens system of at least one of the first through third exemplary embodiments as a photographic optical system will be described with reference to FIG. 7.

In FIG. 7, the digital still camera includes a camera body 20, a photographic optical system 21, a solid-state image pickup device (photoelectric converter) 22, a memory 23, and a finder 24. The photographic optical system 21 is a zoom lens system according to at least one exemplary embodiment. The solid-state image pickup device 22 is, for example, a CCD sensor or a CMOS sensor. The solid-state image pickup device 22 is included in the camera body 20, receives a subject image formed by the photographic optical system 21, and photoelectrically converts the received subject image into information, which is then recorded in the memory 23. The finder 24, such as a liquid crystal panel, is used to observe the subject image formed on the solid-state image pickup device 22.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-366407 filed Dec. 20, 2005, which is hereby incorporated by reference herein in its entirety.

What is claimed is:

1. A zoom lens system comprising, in order from an object side to an image side:
   a first lens unit of positive refractive power;
   a second lens unit of negative refractive power;
   a third lens unit of positive refractive power; and
   a fourth lens unit of positive refractive power,
   wherein the first lens unit is positioned closer to the object side at a telephoto end than at a wide-angle end;
   a distance between the first lens unit and the second lens unit is larger at the telephoto end than at the wide-angle end;
   a distance between the second lens unit and the third lens unit is smaller at the telephoto end than at the wide-angle end;
   a distance between the third lens unit and the fourth lens unit is larger at the telephoto end than at the wide-angle end;
   the first lens unit consists of a negative lens element and a positive lens element;
   the second lens unit consists of a negative lens element and a positive lens element in this order from the object side to the image side; and
   the following conditions are satisfied:

$$-2.0 < f2/fw < -1.1$$

$$4.5 < ft/fw < 7.5$$

$$-1.2 < f2lgn/fw < -0.6$$

where f2lgn is the focal length of the negative lens element in the second lens unit; f2 is the focal length of the second lens unit; and fw and ft are the focal lengths of the entire lens system at the wide-angle end and the telephoto end, respectively.

2. The zoom lens system according to claim 1, wherein the following condition is satisfied:

$$4.0 < f1/fw < 8.2$$

where f1 is the focal length of the first lens unit.

3. The zoom lens system according to claim 1, wherein the following condition is satisfied:

$$17 < (\nu 11 + \nu 22)/2 < 25$$

where ν11 and ν22 are Abbe numbers of materials of the negative lens element in the first lens unit and the positive lens element in the second lens unit, respectively.

4. The zoom lens system according to claim 1, wherein the following conditions are satisfied:

$$0.7 < (R21a + R21b)/(R21a - R21b) < 1.2$$

$$-7 < (R21b + R22a)/(R21b - R22a) < -3.5$$

where R21a and R21b are the curvature radii of surfaces on the object side and the image side of the negative lens element in the second lens unit, respectively; and R22a is the curvature radius of a surface on the object side of the positive lens element in the second lens unit.

5. The zoom lens system according to claim 1, wherein the following condition is satisfied:

$$3.7 < N21 + N22 < 4.0$$

where N21 and N22 are refractive indexes of materials of the negative lens element and the positive lens element in the second lens unit, respectively.

6. The zoom lens system according to claim 1, wherein the negative lens element in the second lens unit is an aspheric lens element.

7. The zoom lens system according to claim 1, wherein the first lens unit includes a cemented lens component formed by cementing the negative lens element and the positive lens element.

8. The zoom lens system according to claim 1, wherein the positive lens element in the second lens unit is a meniscus lens element having a convex surface on the object side.

9. The zoom lens system according to claim 1, wherein the third lens unit includes, in order from the object side to the image side, a positive lens element and a cemented lens component formed by cementing a positive lens element and a negative lens element.

10. The zoom lens system according to claim 1, wherein the fourth lens unit includes a single positive lens element.

11. An image pickup apparatus comprising:
a solid-state image pickup device; and
a zoom lens system configured to guide light from an object to the solid-state image pickup device,
wherein, in order from an object side to an image side, the zoom lens system comprises:
a first lens unit of positive refractive power;
a second lens unit of negative refractive power;
a third lens unit of positive refractive power; and
a fourth lens unit of positive refractive power,
wherein the first lens unit is positioned closer to the object side at a telephoto end than at a wide-angle end;
a distance between the first lens unit and the second lens unit is larger at the telephoto end than at the wide-angle end;
a distance between the second lens unit and the third lens unit is smaller at the telephoto end than at the wide-angle end;
a distance between the third lens unit and the fourth lens unit is larger at the telephoto end than at the wide-angle end;
the first lens unit consists of a negative lens element and a positive lens element;
the second lens unit consists of a negative lens element and a positive lens element in this order from the object side to the image side; and
the following conditions are satisfied:

$$-2.0 < f2/fw < -1.1$$

$$4.5 < ft/fw < 7.5$$

$$-1.2 < f2lgn/fw < -0.6$$

where f2lgn is the focal length of the negative lens element in the second lens unit; f2 is the focal length of the second lens unit; and fw and ft are the focal lengths of the entire lens system at the wide-angle end and the telephoto end, respectively.

12. A zoom lens system comprising, in order from an object side to an image side:
a first lens unit of positive refractive power;
a second lens unit of negative refractive power;
a third lens unit of positive refractive power; and
a fourth lens unit of positive refractive power,
wherein the first lens unit is positioned closer to the object side at a telephoto end than at a wide-angle end;
a distance between the first lens unit and the second lens unit is larger at the telephoto end than at the wide-angle end;
a distance between the second lens unit and the third lens unit is smaller at the telephoto end than at the wide-angle end;
a distance between the third lens unit and the fourth lens unit is larger at the telephoto end than at the wide-angle end;
the first lens unit consists of a negative lens element and a positive lens element;
the second lens unit consists of a negative lens element and a positive lens element in this order from the object side to the image side; and
the following condition is satisfied:

$$17 < (v11 + v22)/2 < 25$$

where v11 and v22 are Abbe numbers of materials of the negative lens element in the first lens unit and the positive lens element in the second lens unit, respectively.

13. The zoom lens system according to claim 12, wherein the following condition is satisfied:

$$3.7 < N21 + N22 < 4.0$$

where N21 and N22 are refractive indexes of materials of the negative lens element and the positive lens element in the second lens unit, respectively.

14. An image pickup apparatus comprising:
a solid-state image pickup device; and
a zoom lens system configured to guide light from an object to the solid-state image pickup device,
wherein, in order from an object side to an image side, the zoom lens system comprises:
a first lens unit of positive refractive power;
a second lens unit of negative refractive power;
a third lens unit of positive refractive power; and
a fourth lens unit of positive refractive power,
wherein the first lens unit is positioned closer to the object side at a telephoto end than at a wide-angle end;
a distance between the first lens unit and the second lens unit is larger at the telephoto end than at the wide-angle end;
a distance between the second lens unit and the third lens unit is smaller at the telephoto end than at the wide-angle end;
a distance between the third lens unit and the fourth lens unit is larger at the telephoto end than at the wide-angle end;
the first lens unit consists of a negative lens element and a positive lens element;
the second lens unit consists of a negative lens element and a positive lens element in this order from the object side to the image side; and
the following condition is satisfied:

$$17 < (v11 + v22)/2 < 25$$

where v11 and v22 are Abbe numbers of materials of the negative lens element in the first lens unit and the positive lens element in the second lens unit, respectively.

15. A zoom lens system comprising, in order from an object side to an image side:
a first lens unit of positive refractive power;
a second lens unit of negative refractive power;

a third lens unit of positive refractive power; and
a fourth lens unit of positive refractive power,
wherein the first lens unit is positioned closer to the object side at a telephoto end than at a wide-angle end;
a distance between the first lens unit and the second lens unit is larger at the telephoto end than at the wide-angle end;
a distance between the second lens unit and the third lens unit is smaller at the telephoto end than at the wide-angle end;
a distance between the third lens unit and the fourth lens unit is larger at the telephoto end than at the wide-angle end;
the first lens unit consists of a negative lens element and a positive lens element;
the second lens unit consists of a negative lens element and a positive lens element in this order from the object side to the image side;
the negative lens element in the second lens unit is an aspheric lens element; and
the following conditions are satisfied:

$$0.7 < (R21a + R21b)/(R21a - R21b) < 1.2$$

$$-7 < (R21b + R22a)/(R21b - R22a) < -3.5$$

where $R21a$ and $R21b$ are the curvature radii of surfaces on the object side and the image side of the negative lens element in the second lens unit, respectively; and $R22a$ is the curvature radius of a surface on the object side of the positive lens element in the second lens unit.

16. An image pickup apparatus comprising:
a solid-state image pickup device; and
a zoom lens system configured to guide light from an object to the solid-state image pickup device,
wherein, in order from an object side to an image side, the zoom lens system comprises:
a first lens unit of positive refractive power;
a second lens unit of negative refractive power;
a third lens unit of positive refractive power; and
a fourth lens unit of positive refractive power,
wherein the first lens unit is positioned closer to the object side at a telephoto end than at a wide-angle end;
a distance between the first lens unit and the second lens unit is larger at the telephoto end than at the wide-angle end;
a distance between the second lens unit and the third lens unit is smaller at the telephoto end than at the wide-angle end;
a distance between the third lens unit and the fourth lens unit is larger at the telephoto end than at the wide-angle end;
the first lens unit consists of a negative lens element and a positive lens element;
the second lens unit consists of a negative lens element and a positive lens element in this order from the object side to the image side;
the negative lens element in the second lens unit is an aspheric lens element; and
the following conditions are satisfied:

$$0.7 < (R21a + R21b)/(R21a - R21b) < 1.2$$

$$-7 < (R21b + R22a)/(R21b - R22a) < -3.5$$

where $R21a$ and $R21b$ are the curvature radii of surfaces on the object side and the image side of the negative lens element in the second lens unit, respectively; and $R22a$ is the curvature radius of a surface on the object side of the positive lens element in the second lens unit.

* * * * *